INVENTOR.
WILLIAM H. FUSS,

May 26, 1970   W. H. FUSS   3,514,126
MOWER UNIT
Filed Oct. 18, 1968   3 Sheets-Sheet 2

INVENTOR.
WILLIAM H. FUSS,
BY
Berman, Davidson & Berman
ATTORNEYS.

May 26, 1970 W. H. FUSS 3,514,126
MOWER UNIT
Filed Oct. 18, 1968 3 Sheets-Sheet 3
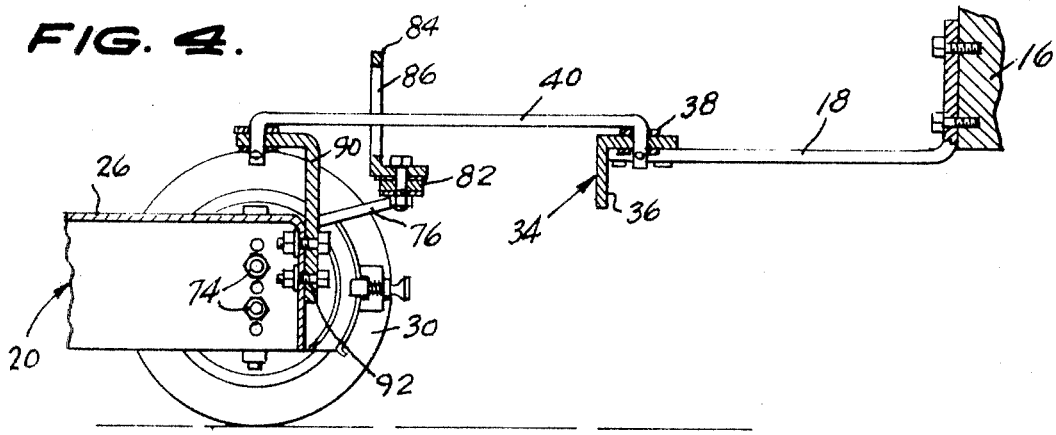
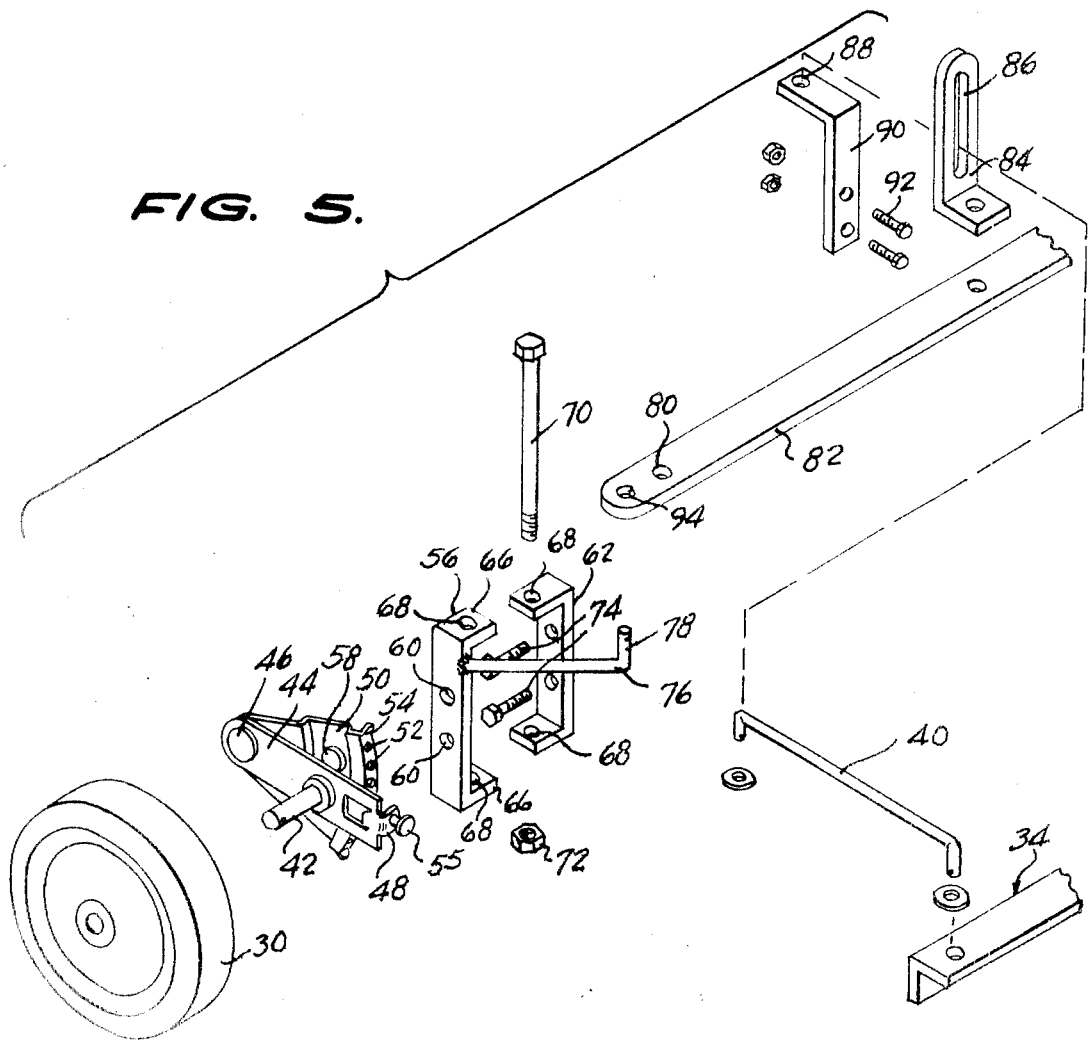
INVENTOR.
WILLIAM H. FUSS,
BY
Berman, Davidson & Berman
ATTORNEYS.

3,514,126
MOWER UNIT
William H. Fuss, 5338 Redan Road,
Stone Mountain, Ga. 30083
Filed Oct. 18, 1968, Ser. No. 768,682
Int. Cl. B62d 53/00
U.S. Cl. 280—411                                   7 Claims

ABSTRACT OF THE DISCLOSURE

A mower unit comprising a self-propelled unit with seating means for an operator with said mower unit having hitch means on the rear thereof for attaching other non-propelled mower units thereto, with the hitching means provided with vertical slot means for enabling the mower units connected to the hitch means to adjust for up and down movement of the mower unit over uneven terrain. The non-propelled units that are connected to the hitch means are further provided with means for permitting turning of the front wheels and other means for locking the front wheels in a straight fore and aft direction when it is desired to unhitch them from the hitch means so that they can be used as manual mower units, and the wheel means of the non-propelled mower units are further provided with means for quickly adjusting the heighth of the wheels without removing the wheels from the mower housing.

---

The present invention generally relates to lawn mowers and more particularly to lawn mowers comprising a plurality of individual mower units that may be detachably connected to a self-propelled unit.

It is an object of the present invention to provide a self-propelled mower unit which normally seats an operator, which unit normally has a rotary cutter means and an engine for propelling the unit forward or rearward with hitching means for attaching other individual mower units thereto.

It is another object of the present invention to provide a self-propelled rotary type mower unit with hitching means on the rear thereof, for detachably connecting thereto a plurality of manually pushed rotary type cutting or mower units, so that the entire assembly can be converted from a single mower unit to a gang type mower unit.

Another object of the present invention is to provide a plurality of mower units that can be utilized as a single unit and which mower units are attached to a self-propelled unit which pulls the manually pushed mower units with wheel turning means. The wheel turning means of the manually pushed mower units permit the pulled units to follow or track the propelling mower unit.

Another object of the present invention is to provide a plurality of mower units that can be connected together so as to cut a wide swath through a field of grass and the like.

It is still a further object of the present invention to provide a mower unit assembly consisting of a single pulling unit and hitching means on the pulling unit for attaching thereto normally manually pushed rotary type mower units so that the normally manually pushed rotary units can be converted therefrom to a gang type mower unit by providing means for permitting the front wheels of the manual mower units to turn so as to track the pulling unit.

It is still a further object of the present invention to provide the manually pushed mower units after they are attached to a pulling mower unit with a central horizontal rod means which rods in a vertical slot means in a vertical member form part of the hitch means to permit up and down movement of the pulled mower units.

It is yet another object of the present invention to provide a mower unit comprising a plurality of individual mower units with a pulling unit and non-propelled units which are pulled thereby, which non-propelled units are further provided with means for locking the front wheels to prevent them from turning at one time so they can be used as a manual power unit and to permit the wheels to be turned at another time so that the non-propelled units can be pulled by a pulling unit and will track the pulling unit.

Various other objects and advantages of the present invention will be readily apparent from the following detailed description, when considered in connection with the accompanying drawings forming a part thereof, and in which:

FIG. 4 is a sectional view taken along the lines 4—4 of FIG. 3;

FIG. 5 is an exploded view of the means embodied in the present invention for permitting up and down movement of the pulled power unit and turning of the front wheels thereof and vertical adjustment of the front wheels thereof.

Figure 2:
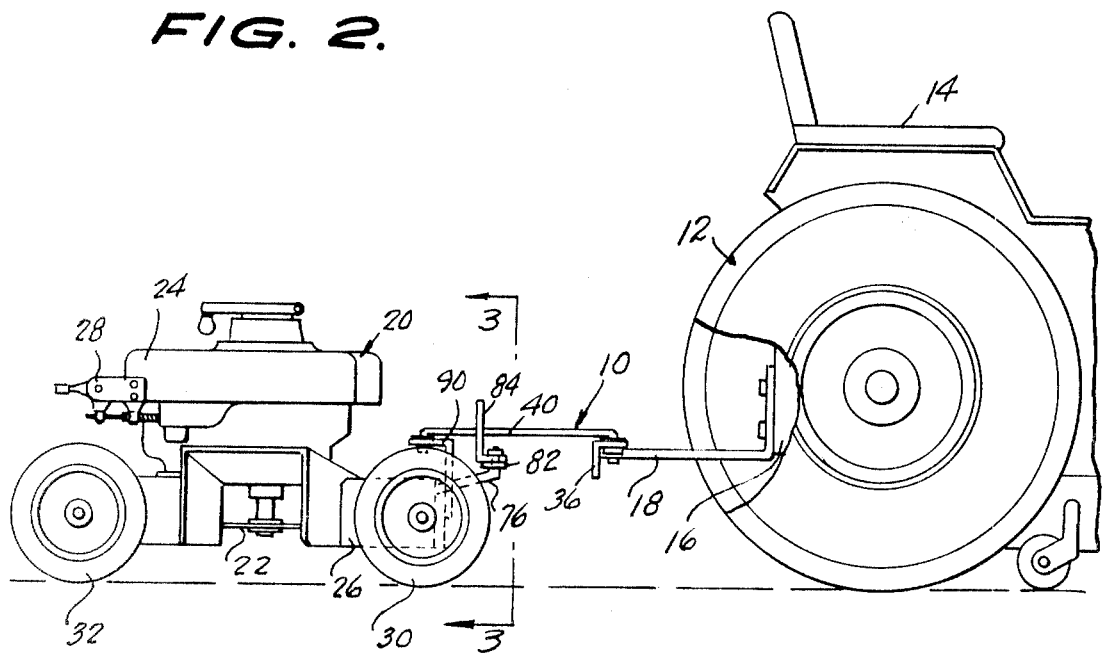
FIG. 2 is a side view of the mower unit of the present invention shown in FIG. 1.
Figure 3:
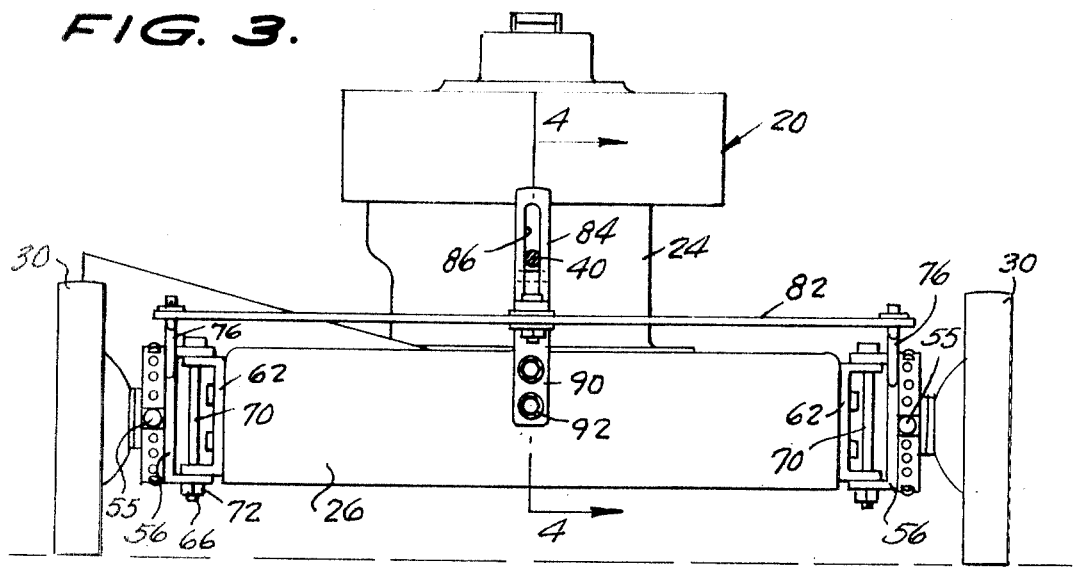
FIG. 3 is a view taken along the lines 3—3 of one of the non-propelled power units that is pulled by the self-propelled unit of the assembly.

Referring to the drawings, the reference numeral 10 generally designates a power unit assembly which includes a self-propelled mower unit 12 of a conventional type that is provided with an internal combustion engine for driving it and with a rotary type cutter blade and a seat 14 for the operating of the mower unit. The chassis 16, as best seen in FIG. 2, has bolted thereto two spaced L-shaped bar members 18.

The power unit also includes two individual non-propelled power units 20. The non-propelled power units are normally manually pushed and are provided with a rotary blade 22 and an internal combustion engine 24 for rotating the blade. The engine 24 is disposed on the hollow housing 26, which covers the rotary blade. The throttle 28 is bolted to the engine 24 so that the speed of the cutting blade 26 may be regulated at any desired predetermined setting.

The housing 26 is provided with front wheels 30 and rear wheels 32. The manually pushed mower unit 20 is of any conventional type that may be readily purchased on the market.

The hitching means 34 comprises a large transverse bar or cross-bar member 36 to which the rear ends of the L-shaped bar members 18 are secured adjacent the central portion of the transverse bar member 36. The opposite ends of the transverse bar member 36 are provided with openings 38 therein, as best seen in FIG. 4, for receiving the front end of the tow or pull rod 40.

The wheels 30 and 32 of the manual or non-propelled mower units 20 are provided with means for adjusting the wheels vertically, as best illustrated in FIG. 5. The wheels are disposed on a stub shaft or axle 42 which is rigidly connected to a vertically adjustable plate 44. The plate 44 is pivotally connected to a pin or pivot member 46 adjacent its rear end and is provided with an in-turned lug 48 adjacent its opposite end. The pin 46 is secured to a plate segment 50 having a plurality of vertically spaced openings 52 therein disposed in an in-turned flange 54. A spring loaded member 55 is disposed in the in-turned lug 48 and is adapted to be inserted in one of the vertical openings 52 in the segment 50. The plate 44 is raised or lowered as desired by pulling out the spring loaded member 55 and rotating or pivoting the plate 44 with respect to the plate 50 so that the spring loaded member 55 may be disposed in any one of the vertically spaced openings 52.

The rear wheels 32 are rigidly connected to the housing 26 by bolts or other suitable means by inserting the bolts through openings in the plate segment 50.

The front wheels 30 are attached to the housing 26 so as to be able to turn with respect thereto by inserting bolts 58 in the plate segment 50, as best seen in FIG. 5, and through the openings 60 in a C-shaped member 56.

The C-shaped member 56 faces inwardly and is provided with a complementary C-shaped member 62 facing outwardly and telescoped within the legs 66 of the C-shaped member 56. The legs of the C-shaped members 56 and 62 are provided with aligned openings 68 therein through which a vertical bolt or axle 70 extends and is secured thereto by a nut 72.

The C-shaped member 62 is secured to the side of housing 26 in a rigid fashion by bolts 74 and appropriate nuts. This construction of the vertical bolt or axle 70 and the two C-shaped members 56 and 62 allows the wheels 30 connected thereto to turn to the left or the right, as distinguished from the rear wheels of the mower unit 20 which are rigidly fashioned to the housing and maintain their fore and aft position and do not turn.

The C-shaped member 56 is provided with a forwardly extending bar or rod 76 having an upturned end 78. The rear end of the bar 76 is rigidly fixed to the C-shaped member 56 by welding or any other suitable means while the upturned portion 78 is freely inserted within an opening 80 in a cross-bar 82.

The cross-bar 82 has bolted to its center an L-shaped member 84 provided with a vertical slot 86 therein. The tow rod 40 is adapted to extend through the slot 86, as best seen in FIG. 4, and the rear end of the tow bar 40 is inserted in an opening 88 in an L-shaped member 90, which is rigidly bolted to the front of the housing 26 by nut and bolt means 92, as best seen in FIG. 4.

Figure 1:
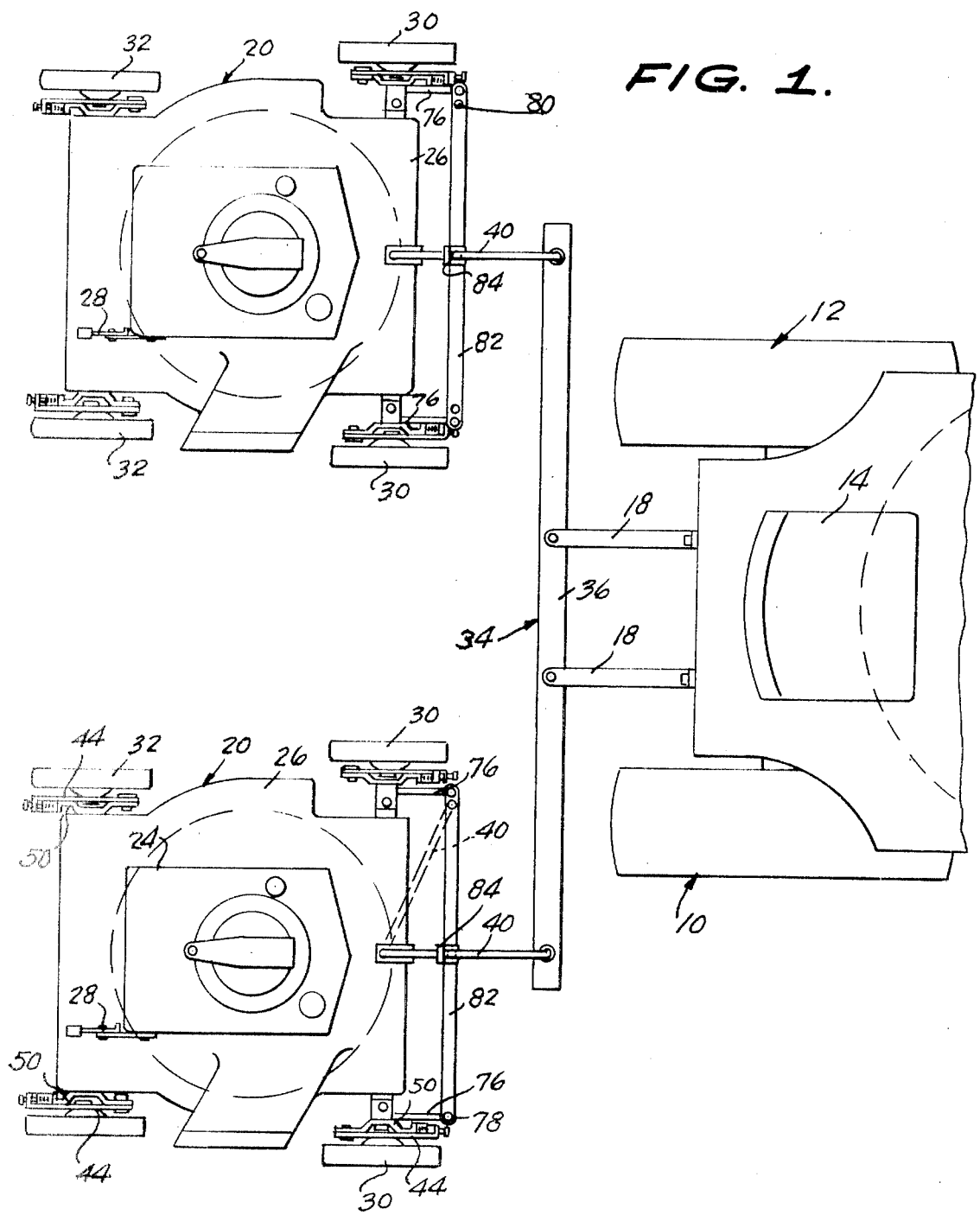
FIG. 1 is a plan view of the mower unit assembly embodying the present invention.

It will be noted that the tow bar 40 can be readily removed from the pivotal connections through the opening 38 and the opening in the L-shaped member 90, and the tow bar 40 may be disposed in the dotted line position indicated in FIG. 1 when it is no longer desired to tow the individual power units 20 by the self-propelled unit 12. The movement or insertion of the tow bar 40 in the aperture 94 adjacent the opening 80 in the cross-bar 82 will lock the front wheels 30 of the mower unit 20 in a fore and aft direction so that the mower may be used manually again.

In operation, when desired to use the present invention, a pair of power mower units which are normally manually pushed, have their tow bars 40 connected to the hitching means 34 by inserting the tow bars 40 in the openings at the opposite ends of the bar 36. At this time, the bar 40 is inserted through the slot 86 in the member 84 so that should the power mower unit or assembly be pulled over uneven terrain, the tow bar 40 riding in the vertical slot 86 will permit up and down movement of the mower. When the grass or field it is desired to mow has been completed, the tow bars may be removed from the hitching means 34 and inserted in the dotted line position shown in FIG. 1, with the front end of a tow bar in the opening adjacent the end of the cross-bar 82 so as to lock the wheels in a fixed position.

The provision of the C-shaped members and the vertical axle 70 threaded thereto and attached to the front wheels 30 permits the wheels to turn or track the propelled vehicle 12 as it moves to the left or the right.

Thus, from the foregoing description, it is apparent that the present invention provides a novel hitching means in which a plurality of manually operated power mower units, which are not self-propelled, except for their cutting blades, can be readily attached to a small propelled unit which is also of a rotary type cutter, so that the units can be used in unison to increase their cutting ability and cut a wide swath through a field.

The foregoing description also shows that the present invention further provides means for converting a manually operated power mower to be used as a gang type mower with a propelling device, and to be reconverted to manual use as desired.

From the foregoing description, it will be apparent that various changes may be made in the form, location and relative arrangement of several parts without departing from the essential characteristics of the invention, and it is to be understood that this invention is not to be limited except by the scope of the appended claims:

What is claimed is:

1. A conversion device for modifying a manual rotary mower into a towed mower comprising wheel bracket means for supporting each front wheel for turning movement, bar means for connecting the bracket means on one front wheel to the bracket means on the other front wheel, a substantially vertical bracket with a substantially vertical slot therein pivotally secured to said bar means, a substantially horizontal tow bar member extending through said slot and riding therein for attachment to a tow unit.

2. The device of claim 1 wherein locking means are provided to prevent turning of said front wheels.

3. The device of claim 2 wherein said vertical bracket is an L-shaped member.

4. The device of claim 3 wherein said bar means includes a cross-bar and two forwardly extending bars secured to the opposite ends of said cross-bar.

5. The device of claim 4 wherein said bracket means for turning movement includes a pair of C-shaped members telescoped together and a vertical axle extends through aligned openings in said C-shaped members, and said front wheels are rigidly secured to one of said C-shaped members, and said forwardly extending bar is rigidly secured at its rear end to one of said C-shaped members and at its front end to said cross-bar.

6. The device of claim 5 wherein said locking means includes opening means in said cross-bar ends adapted to receive the end of the horizontal tow bar members to prevent said front wheels from turning.

7. The device of claim 6 wherein said front wheels are disposed in a horizontal stub axle secured to a vertical plate, and said plate is pivotally connected at its rear to a vertical plate segment with a plurality of vertically spaced holes, and said vertical plate is provided with spring loaded means adapted to be disposed in one of said holes to vertically adjust said wheels.

References Cited

UNITED STATES PATENTS

| 2,699,957 | 1/1955 | White | 280—411 X |
| 3,058,280 | 10/1962 | Lewis | 56—6 |
| 3,068,630 | 12/1962 | Caldwell | 56—6 |
| 3,070,938 | 1/1963 | Winget | 56—6 |
| 3,224,176 | 12/1965 | Taylor | 56—7 |

LEO FRIAGLIA, Primary Examiner

U.S. Cl. X.R.

56—6; 280—103, 445